United States Patent Office 3,382,290
Patented May 7, 1968

3,382,290
PURIFICATION OF DEHYDROGENATION EFFLUENTS
Calvin M. Tidwell, Houston, Tex., and Harlan B. Johnson, Augusta, Ga., assignors to Petro-Tex Chemical Corporation, Houston, Tex., a corporation of Delaware
No Drawing. Filed Aug. 16, 1967, Ser. No. 660,915
15 Claims. (Cl. 260—681.5)

ABSTRACT OF THE DISCLOSURE

Process for dehydrogenation of hydrocarbons in the presence of bromine and for removal of methyl bromide and/or acetylenes from dehydrogenation effluents by contacting the effluents wtih specified Cr (II) complexes. The spent Cr (III) and bromine are recycled.

BACKGROUND OF THE INVENTION

This invention relates to the purification of hydrocarbon streams by the separation of minor amounts of alkyl bromides and/or acetylenes from the hydrocarbons. More particularly, it relates to a process for the separation of minor amounts of methyl bromide and/or vinyl acetylene from aliphatic hydrocarbons of 2 to 6 carbon atoms. In its most preferred form, the invention relates to a process for the separation of methyl bromide and vinyl acetylene impurities from aliphatic hydrocarbons of 4 carbon atoms.

The use of bromine or a bromine liberating material as a catalyst for the dehydrogenation of hydrocarbons to diolefins has been disclosed, for example, in U.S. 3,210,-806, Sept. 21, 1965, and U.S. 3,210,436 Oct. 5, 1965. Unsaturated compounds such as diolefins may be produced by reacting a mixture of the compound to be dehydrogenated, oxygen and a source of bromine at an elevated temperature. The effluent from the dehydrogenation zone or reactor comprises the unsaturated product, some unconverted feed and small amounts of inorganic bromides. The reactor effluent also contains organic alkyl bromides such as methyl bromide and may contain acetylenes such as methyl acetylene and vinyl actylene. Although these materials are present in relatively small amounts, they are serious contaminants in the product and are difficult to remove. For example, the presence of the methyl bromide in the unsaturated product significantly affects the utility of the unsaturated product because the methyl bromide is corrosive. Additionally, since the products are used frequently as monomers, the presence of methyl bromide is undesirable since it affects the polymerization rates of the monomers. Acetylenes are similarly undesirable since they interfere with end uses of the products. Furthermore, bromine is a valuable dehydrogenation catalyst and should be recovered in order to use it in the feed to the dehydrogenation zone.

The problem of the removal of water soluble inorganic bromides such as HBr and NH$_4$Br from the reactor effluent is different from that of the removal of methyl bromide. One distinction we have found is that methyl bromide behaves similarly to the organic product and consequently cannot be washed out with water. When a hydrocarbon effluent contaminated with methyl bromide is washed with water, essentially all of the methyl bromide goes through with the washed hydrocarbon.

The removal of methyl bromide from the reactor effluent is aggravated because the methyl bromide may be present in relatively small amounts based on the other possible components in the effluent such as unreacted feed, products such as monoolefins and diolefins, steam, nitrogen, oxygen and decomposition products. While as much as forty mol percent, based on the amount of hydrocarbons, may be present, normally the methyl bromide will amount to only a small percentage of the effluent. The effluent may contain as low as 0.0001 mol percent; i.e., 1 part per million, based on the amount of hydrocarbon; an effluent containing more than five to ten mol percent methyl bromide is uncommon. Normally the methyl bromide will amount to only a few tenths percent, e.g., 0.2 to 0.8 percent. We have found that methyl bromide is particularly difficult to separate from such compounds as n-butane and cis-butene-2, and cannot be efficiently removed from the effluent by distillation.

As noted, the reactor effluent may also contain minor amounts of acetylenes such as vinyl acetylene and methyl acetylene which pose additional problems. As with methyl bromide, the amount of acetylenes normally will not exceed five to ten mol percent, based on the hydrocarbons present; an average effluent will contain from about 0.0001 mol percent (1 part per million) to a few tenths percent, e.g., 0.2 percent to 0.8 percent. Amounts below 0.0001 percent do not pose serious contaminating problems. While the acetylenes may be present in relatively small percentage, they also interfere with the subsequent use of the products and their removal has been a subject of considerable research effort. For example, U.S. Patent 2,969,407 describes a process for the selective removal of acetylenes wherein the acetylene containing mixture is passed over an alkalyzed iron oxide catalyst at elevated temperatures with the resultant destruction of the acetylene. However, such a process requires the addition of substantial quantities of heat in the form of steam. A further disadvantage is that the ethylenically unsaturated hydrocarbon tends to be destroyed by such a procedure.

It is an object of this invention to provide a process for the separation of minor amounts of methyl bromide and/or acetylenes from hydrocarbons. It is also an object to provide a process for the recovery of bromine from the effluent from dehydrogenation processes utilizing bromine liberating materials as catalysts. Another object is to provide a method for the separation of minor amounts of methyl bromide and acetylenes from hydrocarbons of 4 carbon atoms, such as butenes and butadiene. Other objects of the invention will be evident from the discussion and claims which follow.

SUMMARY OF THE INVENTION

According to this invention, a method has been discovered for the removal of minor amounts of methyl bromide and/or acetylenes from hydrocarbon compositions which contain some C$_4$ hydrocarbons such as n-butane, butadiene, cis-butene, etc. More particularly, the process comprises contacting a dehydrogenation reactor effluent containing aliphatic hydrocarbons of 2 to 6 carbons such as butane, butadiene, cis-butene, etc. and undesired methyl bromide and/or acetylenes with a chromium (II) complex in an inert solvent at a temperature of from about 10° C. to 100° C. wherein the chromium (II) is complexed with a chelating agent selected from the group consisting of:

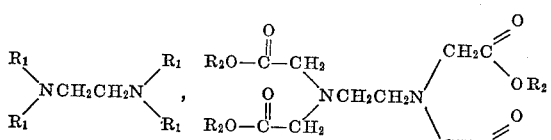

and

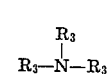

wherein R$_1$ is selected from the group consisting of hydrogen and alkyl of one to four carbon atoms; R$_2$ is selected from the group consisting H, Na, K, and Li, with the provision that not less than one nor more than two of $R_2$ is H; $R_3$ is selected from the group consisting of H, alkyl of one to four carbon atoms and alkanol of one to four carbon atoms with the provision that not more than two of $R_3$ are hydrogen. The results of the invention are all the more surprising in view of the fact that aqueous Cr (II) ion by itself does not reduce methyl bromide.

The invention further comprises a process for the preparation of unsaturated aliphatic hydrocarbons by dehydrogenation comprising contacting a mixture of hydrocarbons at an elevated temperature with oxygen and bromine catalysts, either with or without the presence of additional catalysts, to form a mixture comprising unreacted hydrocarbons, the unsaturated product, and minor amounts of various bromine compounds; separating the inorganic bromides from the mixture; removing the lighter fraction of hydrocarbons, if desired; contacting the mixture with a Cr (II) complex of the type hereinabove described at a temperature of from about 10° C. to about 100° C.; separating the spent Cr (III) catalytic complex; and recovering the dehydrogenated product. The by-products produced may be recovered and provision can be made for regeneration of the complex, recycle of the bromine to the dehydrogenation step, and recycle of a portion of the effluent to the dehydrogenation stage.

The source of bromine for the dehydrogenation may be either elemental bromine or any compound of bromine which would liberate bromine under the conditions of reaction. Suitable sources of bromine are hydrogen bromide, elemental bromine, aliphatic bromides such as methyl bromide, 1,2-dibromoethane, ethyl bromide, amyl bromide and allyl bromide; cycloaliphatic bromides such as cyclohexylbromide; aromatic bromides such as benzyl bromide; bromohydrins such as ethylene bromohydrin; bromine substituted aliphatic acids such as bromoacetic acid; ammonia bromide; organic amine bromide salts such as methyl amine hydrobromide; and the like. Mixtures of various bromine compounds may be used. The preferred sources of bromine are elemental bromine, hydrogen bromide, ammonium bromide, alkyl bromides of one to six carbon atoms and mixtures thereof. The amount of elemental bromine, or the equivalent amount of bromine compound, may be as little as about 0.001 or less mol of bromine per mol of hydrocarbon to be dehydrogenated. Generally, no more than about 0.10 mol or 0.20 mol of bromine per mol of hydrocarbon to be dehydrogenated is necessary, although larger amounts such as 0.5 mol may be used.

The oxygen utilized in the dehydrogenation reaction may be supplied by any source such as pure oxygen or as air. The amount of oxygen will normally be in the range of about 0.25 mol of oxygen to 1.5 or 2.5 mols of oxygen per mol of hydrocarbon to be dehydrogenated. As high as 5 mols of oxygen and higher have been employed. In relation to bromine, the amount of oxygen employed will usually be greater than 1.25 mols of oxygen per atom of bromine. Usually the ratio of mols of oxygen to atoms of bromine will be from about 2 to 150 with the best results having been obtained as ratios between about 8 and 100 mols of oyygen per atom of bromine. Diluents such as steam, nitrogen, carbon dioxide or hydrocarbons may be included to reduce the partial pressure of the compound to be dehydrogenated to less than equivalent to about 10 or 15 inches of mercury absolute at a total pressure of one atmosphere. Desirable results have been obtained utilizing from about 3 to about 30 mols of steam per mol of compound to be dehydrogenated, and excellent results have been achieved with from about 5 to 20 mols of steam per mol of compound to be dehydrogenated.

The dehydrogenation procedure may be conducted in the absence of contact catalysts, but better results are obtained if the reaction is conducted in the presence of catalysts containing metal atoms of Groups IA, IB, IIA, IIB, IIIB, IVA, IVB, VA, VB, VIB, VIIB, VIII, the rare earth elements, thorium, uranium, and mixtures thereof. The preferred catalysts are compounds of elements of Groups IA, IIA, IIIB, IVA, IVB, VA, VB, VIB, VIIB, VIII and mixtures thereof. These groups are based on the Periodic Table as found in the Handbook of Chemistry and Physics, 39th (1957–58) edition, Chemical Rubber Publishing Co. These metal atoms may conveniently be present in the form of the elemental metal, metal oxides, metal hydroxides, metal salts, such as the halides, or metal compounds which will be converted to these forms under the conditions of reaction. Examples of catalysts would be potassium oxide, magnesium oxide, lanthanum oxide, titanium dioxide, vanadium pentoxide, chromous oxide, manganese dioxide, ferric oxide, cobaltic chloride, nickel phosphate, cuprous phosphate, zinc phosphate, stannic phosphate and bismuth trioxide.

The dehydrogenation step will normally be conducted at a temperature of reaction between about 450° C. to about 850° C. or higher, such as about 1000° C. The temperature of reaction is measured at the maximum temperature in the reactor. The flow rates of the reactants may be varied quite widely and can be established by those skilled in the art. Good results have been obtained with flow rates of the compound to be dehydrogenated ranging from about ¼ to 8 liquid volumes of compound per volume of reaction zone, with the volumes of liquid calculated at standard conditions of 760 mm. of mercury absolute at 25° C. If the reactor is unpacked, the reaction zone is defined as the portion of the reaction which is at a temperature of at least 400° C. If the reactor is packed, the reaction zone is defined as the volume of reactor containing packing. The desired residence or contact time of the reactants in the reaction zone under any given set of reaction conditions depends on all the factors involved in the reaction. Contact times such as from about 0.01 to about 5 or 10 seconds have been found to give excellent results. Generally, the contact time will be between 0.1 and one second. Contact time is the calculated dwell time of the reaction mixture in the reaction zone assuming the mols of product mixture are equivalent to the mols of feed.

The preferred compounds to be dehydrogenated are aliphatic hydrocarbons of 2 to 6 carbon atoms, which contain at least two adjacent carbon atoms, each of which carbon atom has at least one hydrogen atom attached. Good results have been achieved with a feed of at least about 50 to 75 mol percent of a monoethylenically unsaturated aliphatic hydrocarbon, such as the hydrocarbons of from 4 to 5 carbon atoms containing a monoethylenically unsaturated straight chain of at least four carbons atoms. Thus, butadiene-1,3 may be produced from butene-1 or butene-2 or mixtures thereof, and isoprene may be produced from any of the methyl butenes, such as 2-methyl butene-1, 2-methyl butene-2 or 2-methyl butene-3 or mixtures thereof. Isoprene can also be produced from methyl butanes, such as 2-methyl butane; also olefins and diolefins may be produced from saturated hydrocarbons, for example butadiene and butene may be produced from n-butane. A mixture of compounds may also be produced, such as a mixture of butadiene-1,3 and butenes from a feedstock of a mixture of n-butane and butene. The process of this invention is particularly useful for the removal of small amounts of methyl bromide and vinyl acetylene from the reactor effluent obtained from the dehydrogenation of hydrocarbons of 4 carbon atoms such as n-butane, butene-1 and butene-2.

The effluent from the reactor may be cooled to condense the water of the effluent in any conventional manner such as by the use of tube type condensers or refrigeration. Normally, the temperature to which the effluent is cooled will be to a temperature no greater than the boiling point of water under the conditions of condensation, but will not be a temperature low enough to condense the ethylenically unsaturated organic compounds. That is, the temperature of the effluent will be cooled to a temperature of no greater than that which is equivalent to 100° C. at atmospheric pressure. The preferred temperatures are from 10° C. to 100° C.

The condensed water may be removed from the hydrocarbon vapor by the usual means known in the art such as by knock-out vessels and vapor separators. The separated water phase will contain the inorganic bromine materials such as hydrogen bromide, elemental bromine or ammonium bromide. Generally at least 90 to 95 weight percent of the inorganic bromine materials are removed prior to the treatment of the hydrocarbon phase of the effluent with the reducing complex of the invention.

The vapor phase from the vapor separators is usually then liquefied, such as by compression, prior to further treatment to remove the methyl bromide. However, in the production of butadiene it is usually desired to first remove most, if not all, of the $C_3$ and lighter components from the mixture. The $C_3$ hydrocarbons may be removed according to techniques known in the art. One technique for the removal of $C_3$ hydrocarbons is to use an oil absorber column. In the column the lean oil, such as naphtha, absorbs essentially all of the $C_4$ and higher hydrocarbons and the lighter fractions are taken off overhead. The fat oil from the absorber may then be stripped to remove the $C_4$ and higher hydrocarbons from the oil. The overhead vapors may then be cooled and accumulated. The overhead from the stripper will contain concentrated butadiene contaminated with methyl bromide and/or acetylenes. In this overhead normally the concentration of butadiene will be at least 40 mol percent of the mixture, the methyl bromide will be less than five mol percent of the mixture and, if present, the vinyl acetylene will be less than five mol percent of the mixture. The overhead from the stripper may conveniently be used as the stream to be treated according to this invention to remove the methyl bromide and/or acetylenes. Of course, the stream at this stage may contain varying quantities of hydrocarbons of from 2 to 6 carbon atoms.

The stream at this point is then contacted with the reducing agents hereinabove described and at the temperatures of from 10° C. to 100° C. as hereinabove set forth. The reaction proceeds according to the following equations:

(1) 2Cr (II) complex +MeBr→Cr (III)
    Br complex+Cr (III)+MeH (methane)
(2) 2Cr (II) complex+vinyl acetylene→
    2Cr (III) complex+butadiene The concentration of the chromium (II) complex is not critical, but good results are obtained if the complex is present in a ratio of from about 1.9 mols per mol of methyl bromide and/or vinyl acetylene respectively present. However, ratios of as low as 1.2 and as high as 8.0 mols of the complex per mol of methyl bromide and/or vinyl acetylene, respectively, may be used. Excellent results are obtained with ratios of from 2.0 to about 4.0 mols Cr (II) complex per mol methyl bromide and/or vinyl acetylene, respectively, while ratios of from 2.0 to 2.4 mols Cr (II) complex per mol methyl bromide and/or vinyl acetylene, respectively, are preferred.

The solvent employed for carrying the chromium (II) complex is not particularly critical although where the complexing agent is an ethylene diamine tetraacetic acid derivative an aqueous solution is preferred. With respect to the other reducing agents, however, any solvent which is inert to the reaction or to the complexing agents may be used. Examples of inert solvents suitable for use in the application of the invention include ethanol, 1-propanol, 1-butanol, and 1-heptanol; ethylene glycol, glycerol, butanol, 2-methoxyethanol, di-ethylene glycol, acetonitrile, propionitrile, isobutyronitrile, benzonitrile, tetrahydrofuran, ethylene diamine and N,N,N',N'-tetramethyl ethylene diamine, diethylene triamine, and related oligopolyethylenimines. Where ethylenediamine tetraacetic acid or its salts are employed as the complexing agent, the solution containing the complex should be regulated at a pH of from 6.8 to 8.0. The reaction may be carried out continuously or in stages depending on the equipment available.

When the reaction is essentially completed, or if the reaction is carried out in stages, when the reaction is essentially completed in a given stage, the spent chromium (III) complex is separated from the hydrocarbon stream. This may be done by conventional separation means such as e.g., the use of a settling tank where the system is aqueous, and the use of low temperature distillation for nonaqueous systems. The spent complex may, if desired, then be regenerated to the Cr (II) state and may be recycled to the reduction reaction. The manner of regeneration is not critical; however, a particularly efficacious method is by electrolytic reduction at the cathode of an electrolytic cell. Bromine is liberated at the anode and can be collected for re-use in the dehydrogenation reactor.

Example I

A dehydrogenation effluent stream containing, on a mol percent basis, about 72.2 percent butadiene, 8.5 percent cis-butene-2, 12.1 percent trans-butene-2, 1.4 percent n-butane, 0.5 percent methyl bromide, and 0.1 percent vinyl acetylene and additional minor percentages of $CO_2$, ethylene, propylene, propyne, isobutylene, and $C_5$ hydrocarbons is washed, $C_3$ hydrocarbons are removed, and the stream is sent to a reduction zone where it is contacted with a Cr (II) complex of ethylene diamine in acetonitrile in a ratio of about 2.2 mols Cr complex per mol of methyl bromide and vinyl acetylene present, respectively. After reaction, the spent complex (now containing Cr (III)) is separated from the effluent by low temperature distillation and sent to an electrolytic regeneration unit, regenerated, and recycled to the reduction zone. The hydrocarbon stream, now substantially free of methyl bromide and vinyl acetylene, may be further purified by any of the methods known in the art for separating these hydrocarbon mixtures. For example, if butadiene is the desired product, the treated hydrocarbon stream may be extractively distilled to separate the butadiene from the remaining hydrocarbons. A normal feed to the extractive distillation column would comprise isobutylene, butene-1, butadiene-1,3, n-butane, trans-2-butene and cis-2-butene. This mixture is subjected to extractive distillation using an organic solvent such as furfural or acetonitrile, or an organic solvent together with water. Essentially all of the butadiene, and some of the 2-butenes are absorbed by the solvent, and the remainder of the $C_4$ hydrocarbons are removed as overhead. The butadiene containing solvent may then be fed to a solvent stripper that separates the $C_4$ hydrocarbons from the solvent. If desired, as a final step, the overhead product from the solvent stripper is fed to a fractionating column. The 2-butenes comprise the bottom product of this column and butadiene with a purity of greater than 98 percent distills overhead and is collected.

Another well known method for the purification of the butadiene is the process of selective absorption with a cuprous salt solution. The butadiene in the treated hydrocarbon overhead from the solvent contacting column may be separated by such a process. The butadiene is preferentially absorbed in the cuprous salt solution and after the other hydrocarbons have been stripped off, the butadiene is stripped off. As described above, the butadiene may then also be fractionated to remove residual hydrocarbons.

Example II

The procedure of Example I is repeated utilizing 2.3 mols Cr (II) complex of ethanolamine per mol of methyl bromide and vinyl acetylene present. Similar results are obtained.

Example III

A reactor containing anhydrous Cr (II) chloride is evacuated and a 1 molar solution of ethylenediaminetetraacetic acid adjusted to a pH of 9.0 with NaOH is added in a ratio of 1:1 mol ethylenediaminetetraacetic acid per mol of Cr (II) chloride. A hydrocarbon mixture containing at least 90 percent n-butane, the balance being other $C_4$ hydrocarbons, is admixed with methyl bromide in a ratio of 0.4 mol methyl bromide per 1.0 mol of n-butane and added to the reactor. The reaction is continued for one hour. Excellent reduction of the methyl bromide is obtained.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein, or required by the prior art.

We claim:

1. A process for the removal of minor amounts of methyl bromide from a dehydrogenation reactor effluent containing hydrocarbons, said methyl bromide being present in an amount of less than 10 mol percent based on the amount of hydrocarbons present, which comprises contacting said effluent with a reducing agent in an inert solvent, said agent being selected from the group consisting of a Cr (II) complex wherein the Cr (II) is complexed with a chelating agent selected from the group consisting of:

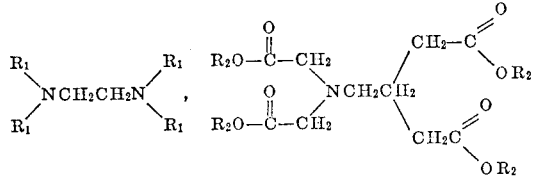

and

wherein $R_1$ is selected from the group consisting of hydrogen and alkyl of one to four carbon atoms; $R_2$ is selected from the group consisting of H, Na, K, and Li, with the provision that not less than one nor more than two of $R_2$ is H; $R_3$ is selected from the group consisting of H, alkyl of one to four carbon atoms, and alkanol of one to four carbon atoms with the provision that not more than two of $R_3$ are hydrogen, and at a temperature of from about 10° C. to 100° C., to reduce the methyl bromide present to methane and form a Cr (III) Br complex, and removing the Cr (III) Br complex from the hydrocarbon effluent.

2. The process of claim 1 wherein the effluent contains hydrocarbons to 2 to 6 carbon atoms.

3. The process of claim 2 wherein the effluent additionally contains acetylenes, the acetylenes are reduced and a Cr (III) complex is formed, and the Cr (III) complex is removed from the effluent.

4. The process of claim 3 wherein the methyl bromide is present in an amount of less than 5 mol percent based on the amount of hydrocarbons, the reducing agent is present in a ratio of from 1.2 to 8.0 mols Cr (II) complex per mol of methyl bromide and acetylenes, respectively, and the acetylenes are present in a amount of less than 5 mol percent based on the amount of hydrocarbons present.

5. The process of claim 3 wherein the reducing agent is selected from the group consisting of

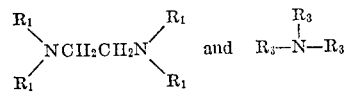

wherein $R_1$ is selected from the group consisting of H and alkyl of one to four carbon atoms, and $R_3$ is selected from the group consisting of H, alkyl of one to four carbon atoms, and alkanol of one to four carbon atoms with the provision that not more than two of $R_3$ are H.

6. The process of claim 3 wherein the reducing agent is selected from the group consisting of

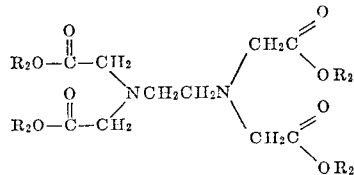

wherein $R_2$ is selected from the group consisting of H, Na, Li, and K, with the provision that not less than one nor more than two of $R_2$ is H, and the reducing agent is supplied in the form of an aqueous solution having a pH of from about 6.0 to about 8.0.

7. A process for the preparation of unsaturated aliphatic hydrocarbons by dehydrogenation which comprises heating at a temperature of at least 400° C. a mixture of an aliphatic hydrocarbon to be dehydrogenated and oxygen, bromine and a catalyst to produce an effluent comprising unsaturated aliphatic hydrocarbon and a minor amount of methyl bromide, removing the methyl bromide by contacting the effluent at a temperature of from about 10° C. to 100° C. with a reducing agent in a solvent inert to methyl bromide, the reducing agent, and the effluent, said agent comprising a Cr (II) complex wherein the Cr (II) is complexed with a chelating agent selected from the group consisting of:

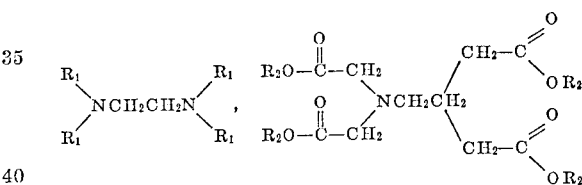

and

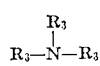

wherein $R_1$ is selected from the group consisting of hydrogen and alkyl of one to four carbon atoms; $R_2$ is selected from the group consisting of H, Na, K, and Li, with the provision that not less than one nor more than two of $R_2$ is H; $R_3$ is selected from the group consisting of H, alkyl of one to four carbon atoms, and alkanol of one to four carbon atoms with the provision that not more than two of $R_3$ are hydrogen, to reduce the methyl bromide present to methane and form a Cr (III) Br complex, and removing the methane and the Cr (III) Br complex from the hydrocarbon effluent.

8. The process of claim 7 wherein the hydrocarbon is an aliphatic hydrocarbon of two to six carbon atoms, and the reducing agent is present in a ratio of 1.2 to 8.0 mols per mol of methyl bromide.

9. The process of claim 8 wherein the methyl bromide is present in an amount of less than 5 mol percent based on the amount of hydrocarbon present.

10. The process of claim 7 wherein the effluent contains a minor amount of acetylenes, the acetylenes are reduced and a Cr (III) complex is formed, and the Cr (III) complex is removed from the effluent.

11. The process of claim 10 wherein the acetylenes are present in an amount of less than 5 mol percent based on the amount of hydrocarbons present, and the reducing agent is present in a ratio of from 1.2 to 8.0 mols Cr (II) complex per mol of methyl bromide and acetylenes, respectively.

12. The process of claim 11 wherein the reducing agent is selected from the group consisting of:

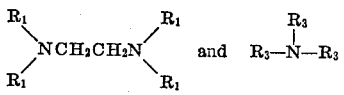

wherein $R_1$ is selected from the group consisting of H and alkyl of 1 to 4 carbon atoms and $R_3$ is selected from the group consisting of H, alkyl of 1 to 4 carbon atoms, and alkanol of 1 to 4 carbon atoms with the provision that not more than two of $R_3$ are H.

13. The process of claim 11 wherein the reducing agent is selected from the group consisting of

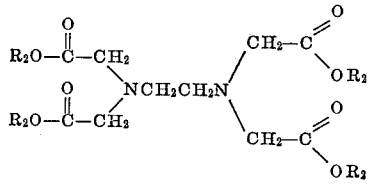

wherein $R_2$ is selected from the group consisting of H, Na, Li, and K, with the provision that not less than one nor more than two of $R_2$ is H, and the reducing agent is supplied in the form of an aqueous solution having a pH of from about 6.0 to about 8.0.

14. The process of claim 13 wherein butadiene is recovered.

15. The process of claim 14 wherein the catalyst employed is ammonium bromide.

References Cited
UNITED STATES PATENTS 3,200,166  8/1965  Bojanowski _____ 260—680

DELBERT E. GANTZ, *Primary Examiner.*

G. E. SCHMITKONS, *Assistant Examiner.*